United States Patent [19]

Murashiro et al.

[11] Patent Number: 5,106,531
[45] Date of Patent: * Apr. 21, 1992

[54] FERROELECTRIC LIQUID CRYSTAL COMPOSITION

[75] Inventors: Katsuyuki Murashiro; Makoto Kikuchi, both of Chiba; Mitsuyoshi Ichihashi, Fukuoka; Kanetsugu Terashima; Masaharu Seki, both of Chiba, all of Japan

[73] Assignee: Chisso Corporation, Japan

[*] Notice: The portion of the term of this patent subsequent to Jan. 9, 2007 has been disclaimed.

[21] Appl. No.: 476,878

[22] Filed: Feb. 7, 1990

[30] Foreign Application Priority Data

Feb. 13, 1989 [JP] Japan .................. 1-33290

[51] Int. Cl.$^5$ .................. C09K 19/12; C09K 19/34
[52] U.S. Cl. .................. 252/299.61; 252/299.66; 359/104
[58] Field of Search .................. 252/299.61, 299.66; 350/350 S

[56] References Cited

U.S. PATENT DOCUMENTS

| | | | |
|---|---|---|---|
| 4,657,695 | 4/1987 | Saito et al. | 252/299.61 |
| 4,818,430 | 4/1989 | Saito et al. | 252/299.61 |
| 4,882,083 | 11/1989 | Terashima et al. | 252/299.61 |
| 4,882,086 | 11/1989 | Terashima et al. | 252/299.61 |
| 4,892,393 | 1/1990 | Terashima et al. | 350/350 S |
| 4,895,671 | 1/1990 | Ushioda et al. | 252/299.61 |
| 4,923,633 | 5/1990 | Gray et al. | 252/299.65 |
| 4,961,875 | 10/1990 | Ohno et al. | 252/299.66 |
| 4,973,426 | 11/1990 | Ohno et al. | 252/299.66 |

FOREIGN PATENT DOCUMENTS

| | | |
|---|---|---|
| 206228 | 12/1986 | European Pat. Off. |
| 289270 | 11/1988 | European Pat. Off. |
| 293763 | 12/1988 | European Pat. Off. |
| 315455 | 5/1989 | European Pat. Off. |

Primary Examiner—Robert L. Stoll
Assistant Examiner—C. Harris
Attorney, Agent, or Firm—Leydig, Voit & Mayer

[57] ABSTRACT

The present invention provides a ferroelectric liquid crystal composition which can exhibit an $S_C^*$ phase in an extensive temperature range inclusive of room temperature and which has quick response properties and a large tilt angle, and it also provides a switching element containing the above-mentioned ferroelectric liquid crystal composition and having excellent response properties.

The present invention is connected with a ferroelectric liquid crystal composition comprising at least one component A and at least one component B described hereinafter, the content of said component A being from 30 to 95% by weight, the content of said component B being from 5 to 50% by weight, said component A being a compound represented by the formula (I)

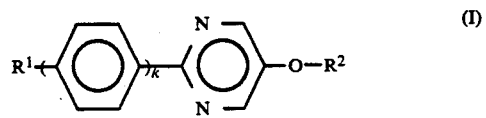

(I)

wherein $R^1$ is an alkoxy group having 3 to 14 carbon atoms, k is an integer of 1 and $R^2$ is an optically active group, said component B being a ferroelectric liquid crystal compound having a spontaneous polarization of 10 $nCcm^{-2}$ or more.

16 Claims, No Drawings

FERROELECTRIC LIQUID CRYSTAL COMPOSITION

BACKGROUND OF THE INVENTION (1) Field of the Invention

The present invention relates to a ferroelectric liquid crystal composition. More specifically, it relates to a ferroelectric liquid crystal composition having quick response properties and a large tilt angle, and to an optical switching element containing this composition.

(2) Description of the Prior Art

Liquid crystal compounds are widely used as materials for display elements, and most of these liquid crystal elements are on TN type display systems and the liquid crystal materials are in the state of nematic phase.

The TN type display system has advantages such as being less fatiguing to the eyes and extremely small consumption of electric power because of being a non-emissive type, whereas it has disadvantages such as slow response and disappearance of display at certain visual angles.

In recent years, this system is being improved in characteristics of flat displays, and in particular, the speed-up of response and the enlargement of visual angle are demanded.

In order to meet these demands, improvements in liquid crystal materials have been attempted. However, as compared with other emissive type displays (e.g., electroluminescence displays and plasma displays), it is apparent that the TN type display system is much poorer in response time and the extent of the viewing or visual angle.

In order that characteristics of the liquid display element such as features of the non-emissive type and small consumption of electric power may be maintained and in order that quick response corresponding to that of the emissive type displays may be assured, it is essential to develop a novel liquid display system in place of the TN type display system.

As one of such attempts, a display system in which the optical switching phenomenon of ferroelectric liquid crystals is utilized has been suggested by N. A. Clark and S. T. Lagerwall (see Appl. Phys. Lett. 36, p 899, 1980).

The presence of the ferroelectric liquid crystals was announced for the first time in 1975 by R. B. Mayer et al. (see J. Phys., 36, p 69, 1975), and from the viewpoint of structure, these crystals belong to a chiral smectic C phase, a chiral smectic I phase, a chiral smectic F phase, a chiral smectic G phase, a chiral smectic H phase, a chiral smectic J phase and a chiral smectic K phase (hereinafter referred to simply as "$S_C^*$ phase", "$S_I^*$ phase", "$S_F^*$ phase", "$S_G^*$ phase", "$S_H^*$ phase", "$S_J^*$ phase" and "$S_K^*$ phase", respectively).

In the chiral smectic phase, molecules forms a layer and incline to the surface of the layer, and a helical axis is vertical to this layer surface.

In the chiral smectic phase, spontaneous polarization takes place, and therefore, when a DC electric field is applied to this layer in parallel therewith, the molecules turn round the helical axis in accordance with its polarity. The display element of the ferroelectric liquid crystals utilizes this switching phenomenon.

Nowadays, of the chiral smectic phases, much attention is particularly paid to the $S_C^*$ phase.

The display system in which switching phenomenon of the $S_C^*$ phase is utilized can be further classified into two types: a birefringence type system using two polarizers and a guest/host type system using a dichoric dye.

Features of these display systems are:

(1) Response time is very short.
(2) Memory properties are present.
(3) Display performance is not greatly affected by visual angle.

Thus, the display systems have the possibility of achieving the high-density displays and are considered to be effectively utilizable in the display element. In addition thereto, in the guest/host type display system, only one polarizing plate is used, and therefore this system has the following excellent feature:

(4) there is no coloring by retardation.

However, also in this display system, there are now many problems to be solved.

In the guest/host type system, transmittances $T_{on}$ and $T_{off}$ are transmittances of light at the time of "on" or "off", when the polarizing axis of the polarizer is arranged so as to coincide with a liquid crystal molecular axis at the time of "off". Provided that an angle made by the polarizing axis and a helical axis is denoted by δ, $T_{on}$ and $T_{off}$ are represented by the formulae:

$$T_{on} = \tfrac{1}{2}\{\cos^2(\delta+\theta)e^{-a\|(\lambda)d} + \sin^2(\delta+\theta)e^{-a\perp(\lambda)d}\} \quad (1)$$

$$T_{off} = \tfrac{1}{2}\{\cos^2(\delta-\theta)e^{-a\|(\lambda)d} + \sin^2(\delta-\theta)e^{-a\perp(\lambda)d}\} \quad (2)$$

wherein $a\|(\lambda)$ and $a\perp(\lambda)$ are absorption coefficients of light by a dichroic dye in the liquid crystal to polarized lights parallel and perpendicular to the liquid crystal molecular axis, respectively, $\theta$ is a tilt angle, and d is the thickness of a cell [Solid Physics, Vol. 20, No. 7, p. 481-488 (1985)].

It can be understood from the formulae (1) and (2) that when $\theta = \delta = \pi/4$ (45°), the highest display contrast is obtained. In other words, the $S_C^*$ composition in which the tilt angle is 45° gives the highest contrast. This angle is just twice as much as the tilt angle (22.5°) of the liquid crystal composition which can provide the highest display contrast in the birefringence type element.

On the other hand, it is indicated by the following formula that a response time is rapidly slow, as the tilt angle is great:

$$\tau = \frac{\eta_0 \sin^2\theta}{P_s \cdot E} \quad (3)$$

where $\tau$ is a response time, $\eta_0$ is a standardized inherent rotational viscosity which is independent of a tilt angle, $\theta$ is a tilt angle, $P_s$ is a spontaneous polarization, and E is a field strength.

Therefore, the response time of the ferroelectric liquid crystal composition used in the existent guest/host element is much slower than in the birefringence type element, and thus the practical ferroelectric liquid crystal materials having the large tilt angle and the quick response times have been relatively unknown till now.

For example, a ferroelectric liquid crystal composition for a guest/host type display element described in Japanese Patent Laid-open Publication No. 22889/1987 and a ferroelectric liquid crystal composition described in Japanese Patent Application No. 192633/1988 are unsatisfactory as follows. In the composition in which the tilt angle is 40° or so, a response time is slow, and in the composition in which the response time is about 200

μsec., the tilt angle is as small as about 30°. These compositions are not practical yet.

In order to obtain the ferroelectric liquid crystal composition having a quick response time and a large tilt angle, it is required that the composition has low viscosity, as understood from the above-mentioned three formulae.

Furthermore, the ferroelectric liquid crystal composition having a large tilt angle can be applied to spatial optical modulators in which refractive index anisotropy is utilized and band pass filters through which the light having a certain wave length is only allowed to pass (see Hugh J. Masterson, Noel A. Clark et al., Annual Meeting Draft in 1988, OPTICAL SOCIETY OF AMERICA, p. 118).

The ferroelectric liquid crystal composition having a large tilt angle is applicable to the above-mentioned fields, and therefore with regard to this type of composition, it is a requirement to additionally improve the response properties and the tilt angle.

SUMMARY OF THE INVENTION

The first object of the present invention is to provide a ferroelectric liquid crystal composition which can exhibit an $S_C^*$ phase in an extensive temperature range inclusive of room temperature and which has quick response properties and a large tilt angle.

The second object of the present invention is to provide a switching element containing this composition and having excellent response properties.

The present inventors have intensively performed research with the intention of further improving the inventions described in Japanese Patent Laid-open Publication No. 22889/1987 and Japanese Patent Application No. 192633/1988, and as a result, they have found that when some compounds are combined as exhibited hereinafter, a ferroelectric liquid crystal composition can be obtained which can assume an $S_C^*$ phase in an extensive temperature range inclusive of room temperature and which has quick response properties and a large tilt angle. Thus, the present invention has been achieved on the basis of this knowledge.

That is, (1) the present invention is directed to a ferroelectric liquid crystal composition comprising at least one component A and at least one component B which will be described hereinafter, the content of the component A being from 30 to 95% by weight, the content of the component B being from 5 to 50% by weight.

Here, the component A is a compound represented by the formula (I)

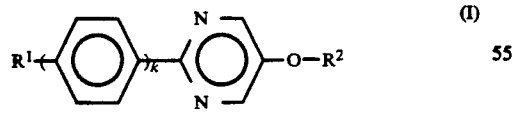

wherein $R^1$ is an alkyl group or alkoxy group having 1 to 18 carbon atoms, k is an integer of 1 or 2, and $R^2$ is a straight-chain or branched alkyl group.

The component B is a ferroelectric liquid crystal compound having a spontaneous polarization of 10 nCcm$^{-2}$ or more.

(2) The second feature of the present invention is directed to a ferroelectric liquid crystal composition abovementioned in (1) in which $R^1$ of the compound represented by the formula (I) is an alkyl group or alkoxy group having 3 to 14 carbon atoms, and $R^2$ is an optically active group represented by the formula (II)

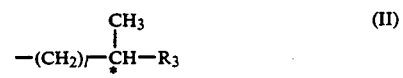

wherein l is an integer of 0 to 10, $R^3$ is an alkyl group having 2 to 10 carbon atoms, and * denotes an asymmetric carbon atom.

(3) The third feature of the present invention is directed to a ferroelectric liquid crystal composition abovementioned in (2) in which l of the formula (II) in the preceding paragraph (2) is an integer of 2 to 7, and $R^3$ is an alkyl group having 2 to 4 carbon atoms.

(4) The fourth feature of the present invention is directed to a ferroelectric liquid crystal composition abovementioned in (1), (2) and (3) in which $R^1$ of the formula (I) in the preceding paragraphs (1), (2) and (3) is an alkoxy group having 3 to 12 carbon atoms.

(5) The fifth feature of the present invention is directed to a ferroelectric liquid crystal composition abovementioned in (2), (3) and (4) in which the compound comprising the group of the formula (II) in the preceding paragraphs (2), (3) and (4) is a racemic modification.

(6) The sixth feature of the present invention is directed to a ferroelectric liquid crystal composition abovementioned in (1) to (5) in which the component B in the preceding paragraphs (1) to (5) is a compound represented by the formula (III)

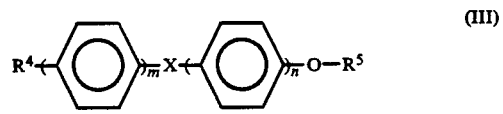

wherein $R^4$ is an alkyl group or alkoxy group having 2 to 14 carbon atoms, m is an integer of 1 or 2, n is an integer of 0 or 1, X is

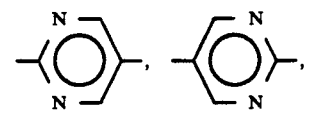

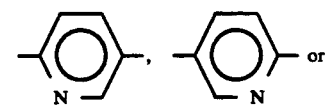

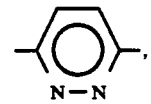

and $R^5$ is an optically active group having one or more asymmetric carbon atom.

(7) The seventh feature of the present invention is directed to a ferroelectric liquid crystal composition abovementioned in (6) in which $R^5$ of the compound represented by the formula (III) in the preceding paragraph (6) is an optically active group represented by the formula (IV), (V) or (VI)

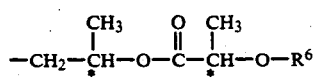  (IV)

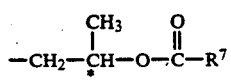  (V)

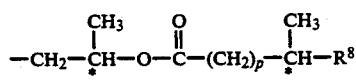  (VI)

wherein each of $R^6$, $R^7$ and $R^8$ is an alkyl group having 2 to 10 carbon atoms, p is an integer of 0 or 1, and * denotes an asymmetric carbon atom.

(8) The eighth feature of the present invention is directed to a ferroelectric liquid crystal composition abovementioned in (1) to (7) in which the phase transition series of each ferroelectric liquid crystal composition in the preceding paragraphs (1) to (7) is an isotropic liquid → a cholesteric phase → a chiral smectic C phase in the order of from a high-temperature side to a low-temperature side.

(9) A switching element containing each ferroelectric liquid crystal composition in the preceding paragraphs (1) to (8).

DETAILED DESCRIPTION OF THE INVENTION

Ferroelectric liquid crystal compounds in which the spontaneous polarization of a component B in the present invention is 10 $nCcm^{-2}$ or more include a ferroelectric liquid crystal compound assuming an $S_C*$ phase and a spontaneous polarization of 10 $nCcm^{-2}$ or more, and a ferroelectric liquid crystal compound assuming no $S_C*$ phase but having a spontaneous polarization of 10 $nCcm^{-2}$ or more potentially.

The meaning of the above-mentioned expression "having the spontaneous polarization potentially or similar expressions" is as follows:

For example, a compound represented by the formula (IV) in undermentioned Example 2 does not exhibit the $S_C*$ phase by itself, and thus the spontaneous polarization of this compound cannot be measured. However, when 20 parts by weight of this compound is added to a smectic mixture of the following compounds having no spontaneous polarization, the resulting composition exhibits a spontaneous polarization of 43 $nCcm^{-2}$ at 25°) C.:

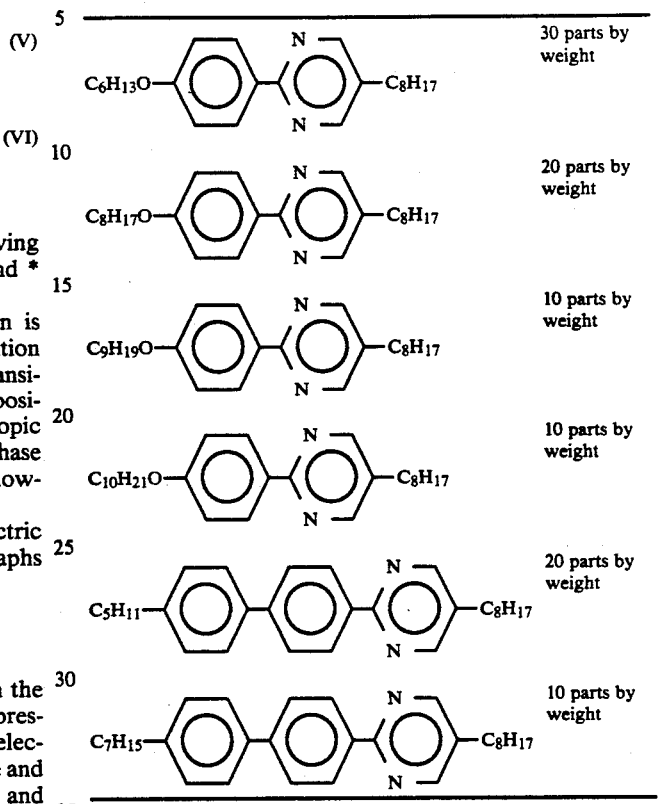

Then, this value is extrapolated to 100%, and in consequence, the compound of the formula (iv) is considered to have a spontaneous polarization of 215 $nCcm^{-2}$ potentially.

Next, explanation will be made taking examples.

With regard to a ferroelectric liquid crystal composition (a) comprising the following compounds

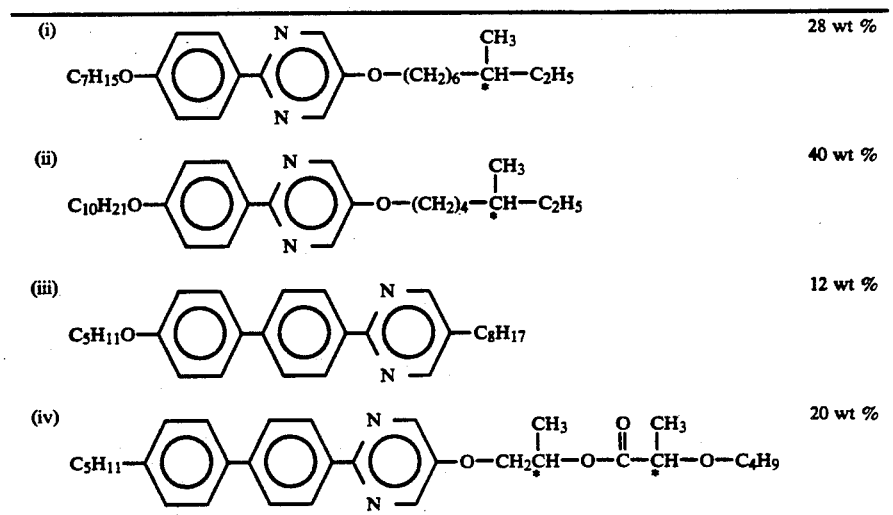

[the compounds (i) and (ii) correspond to component A, and the compound (iv) corresponds to component b], a transition temperature is

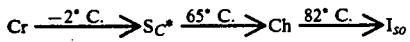

wherein Cr is a crystalline phase, Ch is a cholesteric phase, $I_{so}$ is an isotropic liquid phase, a tilt angle at 25° C. is very large, 45°, a spontaneous polarization is 87 nCcm$^{-2}$, and the response time is as quick as 320 μsec. As is apparent from the foregoing, the composition obtained by mixing the components A and B in accordance with the present invention exhibits excellent properties. The above-mentioned compound (iii) is a compound other than the components A and B. The compounds (i) and (ii) which correspond to component A originally have an $S_{C^*}$ range in a relatively low temperature region, but the compound (iii) assumes the $S_C$ phase in a relatively high and wide temperature range. Therefore, the compound (iii) is added for the purpose of enlarging the $S_{C^*}$ range. As in such a case, a different compound than the components A and B may be added. Typical examples of the mixable compounds other than the components A and B are as follows:

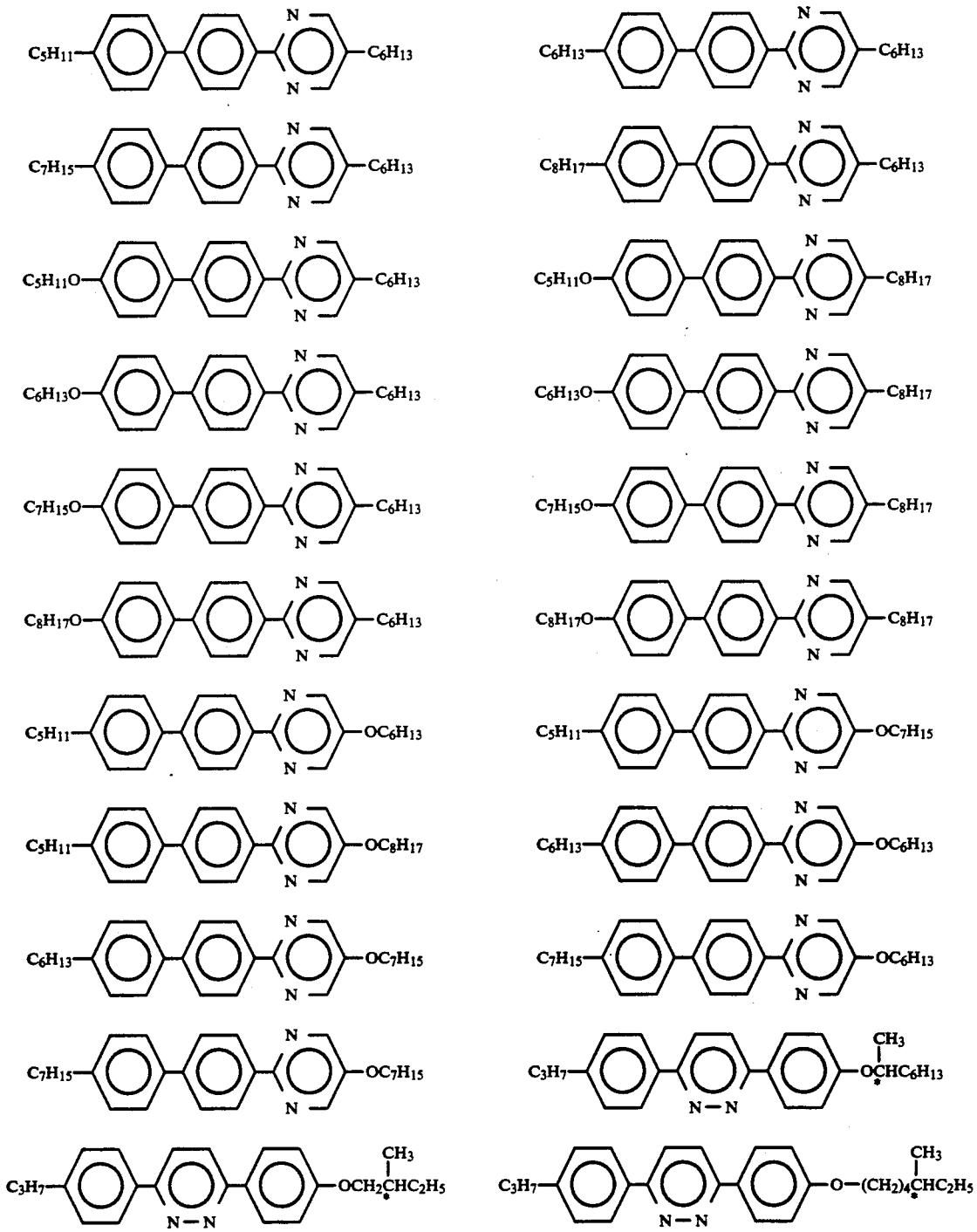

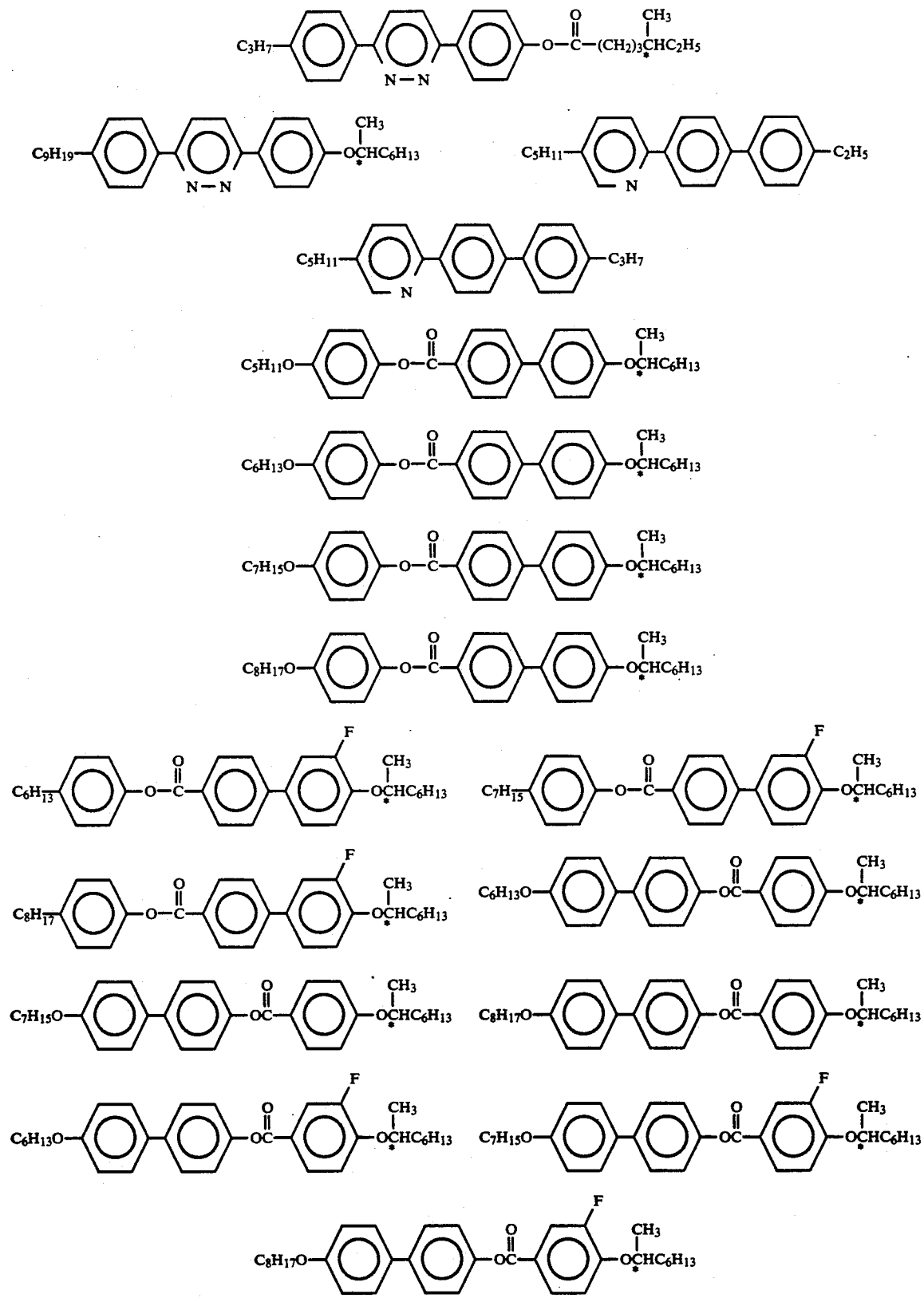
On the other hand, with regard to a ferroelectric liquid crystal composition (b) in which the component A of the above-mentioned composition (a) is replaced with another system and the component B is used in the same ratio and which comprises the following compounds

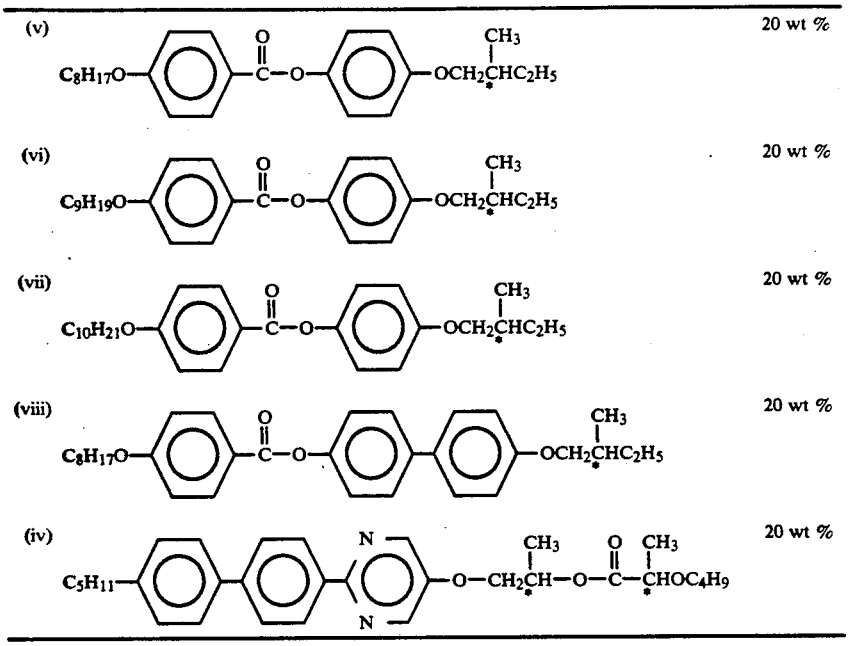

a transition temperature is

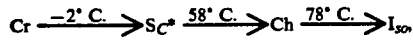

a spontaneous polarization at 25° C. is 74 nCcm$^{-2}$, and a response time is 324 μsec., but a tilt angle is as small as 26°. Therefore, this ferroelectric liquid crystal composition (b) is unsuitable for guest/host type elements.

When the composition (a) is compared with the composition (b), it is apparent that the component A functions to remarkably increase the tilt angle. Furthermore, even if the component A is a racemic modification, this functional effect does not change.

Next, with regard to a ferroelectric liquid crystal composition (c) in which the component A of the composition (a) is used in the same ratio and the component B is replaced with a compound (viii) having a spontaneous polarization value of less than 10 nCcm$^{-2}$ (the spontaneous polarization value at 25° C. is 1.4 nCcm$^{-2}$) and which comprises the following compounds

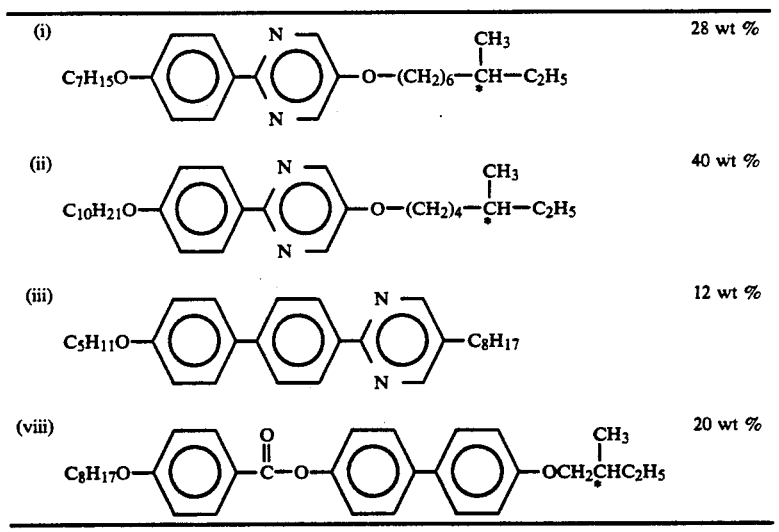

a transition temperature is

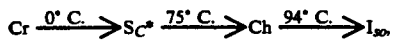

a tilt angle at 25° C. is very large, 46°, but a response time is 2.3 msec. Therefore, the ferroelectric liquid crystal composition (c) is unpractical in point of the response time.

When the composition (a) is compared with the composition (c), it is apparent that the component B has the function to accelerate a response speed. Furthermore, it is also apparent as in the case of the comparison between the compositions (a) and (b) that the component A has the effect of increasing the tilt angle.

These examples indicate that in order to increase the tilt angle and to accelerate the response speed, the components A and B are essential.

Suitable examples of the component A are as follows (refer to Japanese Patent Application No. 265933/1987):

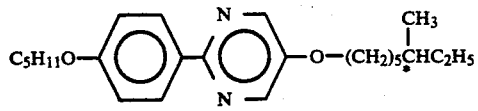
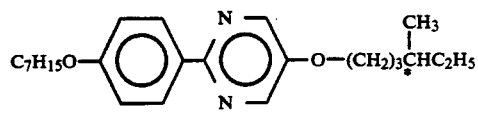
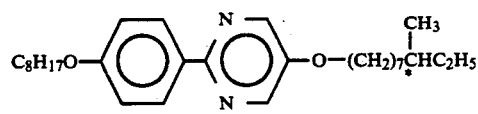
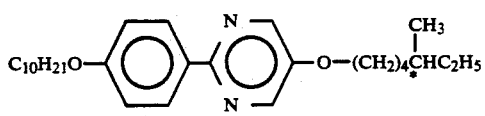
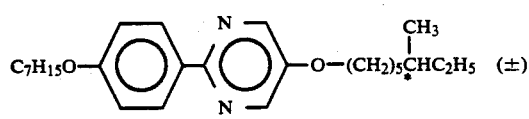
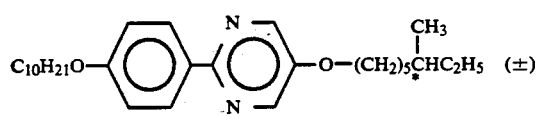
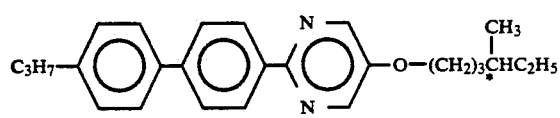
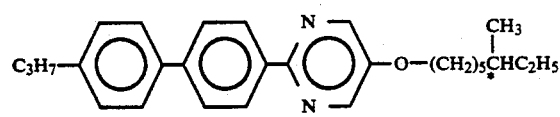
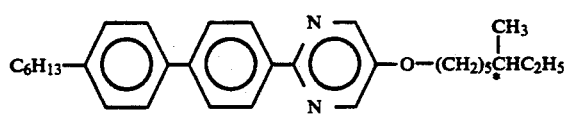
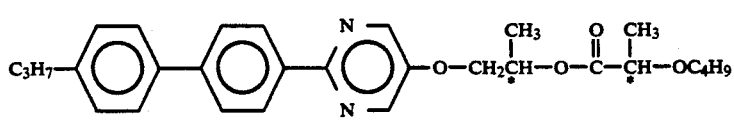
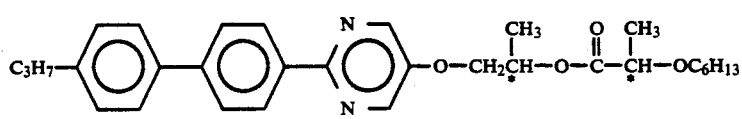

wherein ± denotes a racemic modification.

Suitable examples of the component B are as follows (refer to Japanese Patent Application No. 103977/1987):

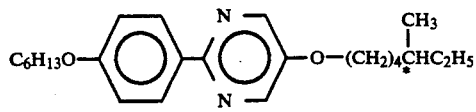
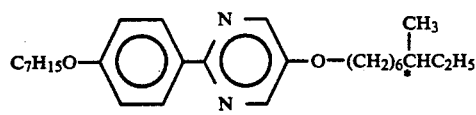
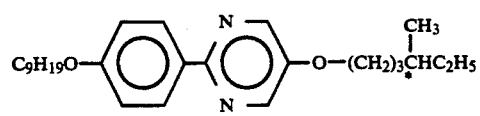
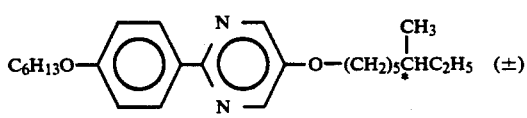
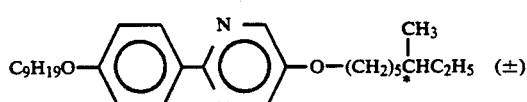
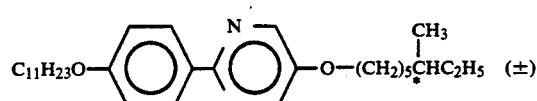
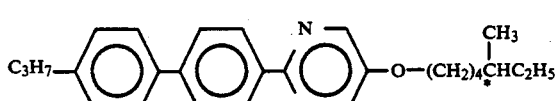
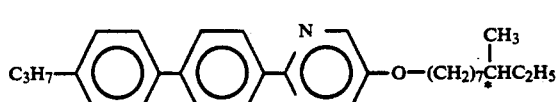
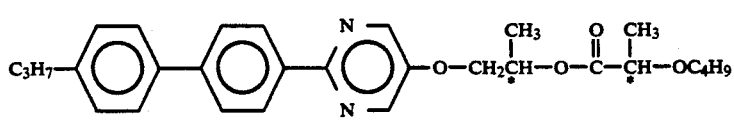
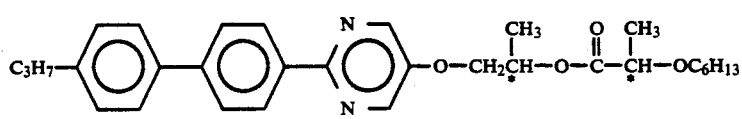

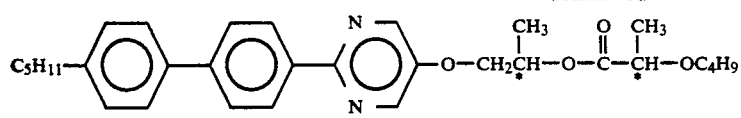
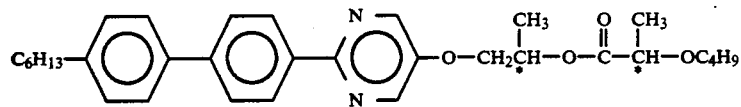
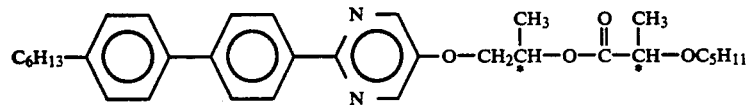
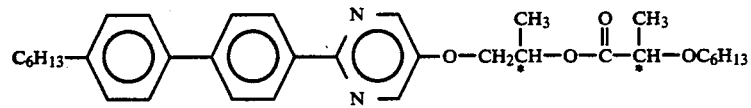
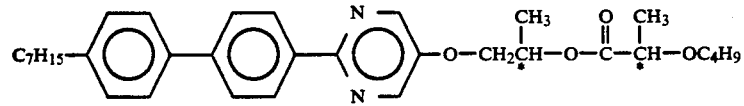
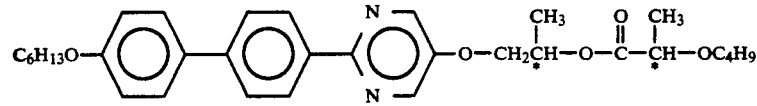
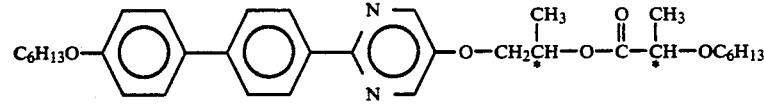
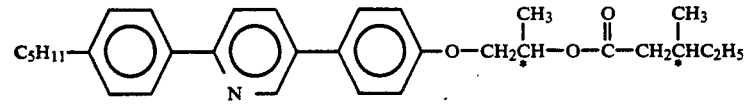
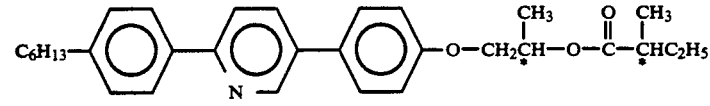
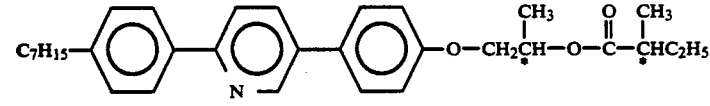
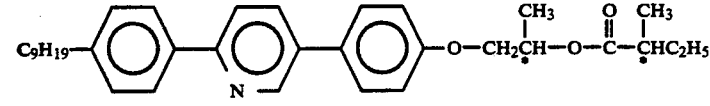
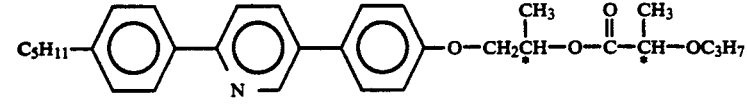
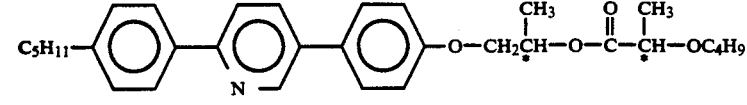

-continued
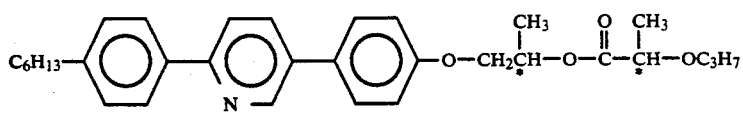
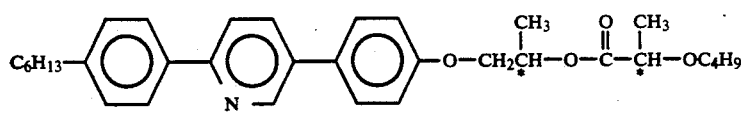
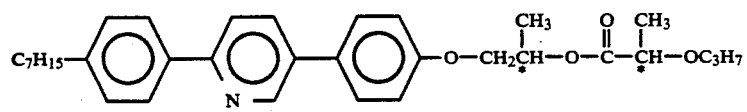
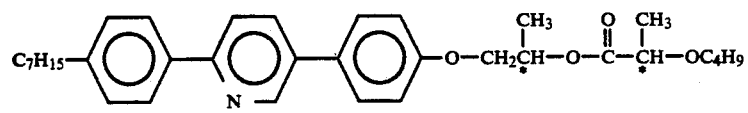
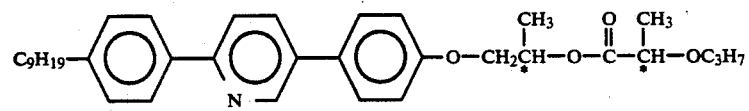
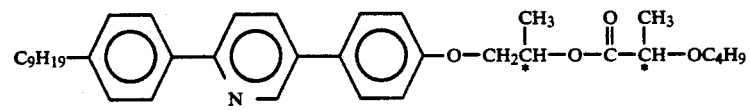
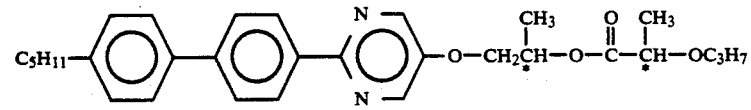
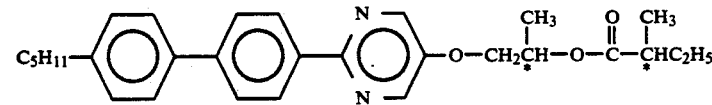
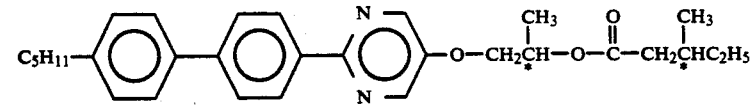
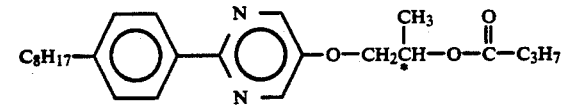
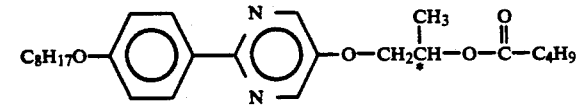
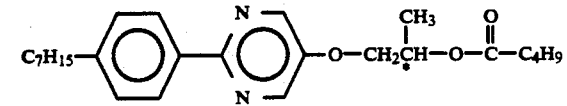
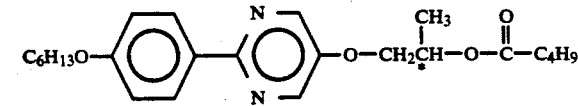

-continued

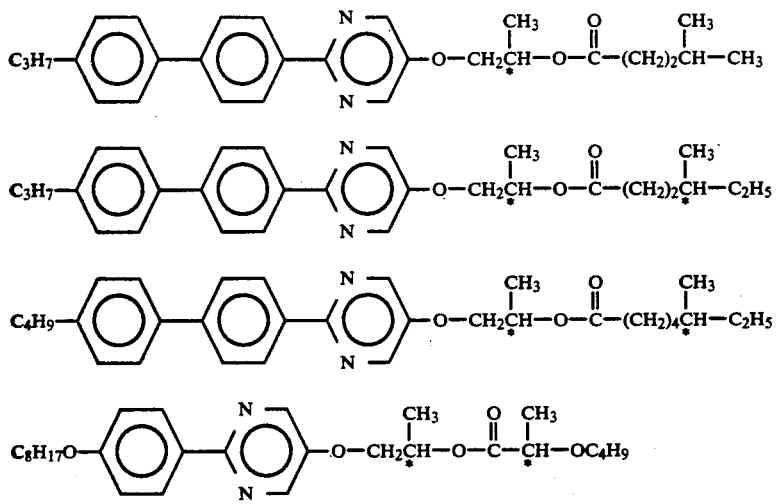

Compounds other than the compounds having the formula (III) can also be used as the component B, so long as each of these compounds has a spontaneous polarization of 10 nCcm$^{-2}$ or more. Furthermore, it is also acceptable to simultaneously use two or more of such compounds.

When the composition of the present invention is used, elements which have characteristics that is unable to realize by using compositions having only a small tilt angle, can be obtained and elements also can be obtained which are much better in characteristics, such as contrast, than elements formed by using compositions having a small tilt angle. For example, the composition of the present invention is suitable for guest/host type elements in which a dichroic dye is mixed. Moreover, the composition of the present invention is also suitable for elements of spatial optical path transducers and optical modulators in which total internal reflection is utilized and elements having band pass characteristics in which retardation is utilized, since the quick response properties and a great variation Δn attributable to the large tilt angle of the composition of the present invention function to improve the characteristics of these elements.

In these elements, an aligned film on at least one surface of a substrate is preferably prepared from a polymer such as a polyimide, polyamide, polyvinyl alcohol, nylon, polyamide imide or polyimidosiloxane, or a metal oxide film such as SiO, yttrium oxide or titanium oxide which has a thickness of 100 to 3000 Å.

Displays and shutter-arrays manufactured by combining the above-mentioned elements can be driven by any of an active drive, static drive and dynamic drive.

The composition of the present invention can be easily prepared in accordance with a usual mixing procedure of the ferroelectric liquid crystal. For example, the composition which can assume the S$_C$* phase in a wide temperature range inclusive of room temperature can be easily prepared by mixing a plurality of components so as to form a low-melting mixture. In order to prevent helical defects from occurring in a cell, the plural components having mutually opposite helical twist senses in the S$_C$* phase should be mixed so that a helical pitch in the S$_C$* phase may be extended to a length of a cell gap or more. Furthermore, it is an important operation to extend the helical pitch in the cholesteric phase with the intention of improving alignment properties, and this extension of the helical pitch can also be achieved by mixing the plural components having mutually opposite helical twist senses in the cholesteric phase, as in the case of the above-mentioned extension of the helical pitch in the S$_C$* phase.

According to the present invention, the ferroelectric liquid crystal composition having quick response properties and large tilt angle can be obtained, and when this liquid crystal composition is used, guest/host type elements, optical path transducer elements and the like can be obtained which are excellent in contrast and response properties simultaneously.

EXAMPLES

Now, the present invention will be described in detail in reference to examples, and the scope of the present invention should not be limited to these examples.

In the present invention, various functions were measured by the following procedures:

The magnitude of a spontaneous polarization (Ps) was measured in accordance with a triangular wave method, and a tilt angle (θ) was obtained from a transfer angle (corresponding to 2θ) between an extinction angle when a sufficiently high electric field of a critical electric field or more was applied to a cell subjected to homogeneous alignment and an extinction angle when polarity is inverted. A response time was evaluated from a variation in strength of transmitted light when a rectangular wave having 100 Hz was applied at ±5 Vμm$^{-1}$ to an already aligned cell having an electrode gap of 10 μm and containing each composition therein. A cholesteric pitch was obtained by measuring a space (l) of a disclination line through a polarization microscope, and then calculating a theoretical formula P (pitch)=2l tan θ wherein θ was a tilt angle of a wedge type cell.

In the examples, compounds to enlarge the temperature range for an S$_C$* phase and compounds to extend a cholesteric pitch or an S$_C$* pitch are used in addition to components A and B which are essential components of the present invention. However, it should be noted that the quick response properties and the high tilt angle of the composition regarding the present invention are not impaired at all by mixing these additional compounds.

EXAMPLE 1

In accordance with the present invention, a ferroelectric liquid crystal composition having the following composition was prepared. Here, "A" and "B" on the right side of each formula denote a component A and a component B, respectively, and the formula having no symbol means a compound other than the components A and B, which shall apply to the following.

At 25° C., Ps was 68 nCcm$^{-2}$, the tilt angle was 43°, and the response time was 250 μsec.

As is apparent from the foregoing, the combination of the components A and B permits obtaining the composition of the present invention which exhibits the S$_C$* phase in a wide temperature range inclusive of room temperature and which has the quick response properties and the large tilt angle.

| | Structure | Component | wt % |
|---|---|---|---|
| (i) | C$_7$H$_{15}$O—⟨⟩—⟨N=N⟩—O—(CH$_2$)$_6$CHC$_2$H$_5$ (CH$_3$) | A | 9.8 wt % |
| (ii) | C$_{10}$H$_{21}$O—⟨⟩—⟨N=N⟩—O—(CH$_2$)$_4$CHC$_2$H$_5$ (CH$_3$) | A | 14 wt % |
| (ix) | C$_5$H$_{11}$O—⟨⟩—⟨N=N⟩—O—(CH$_2$)$_5$CHC$_2$H$_5$ (CH$_3$) | A | 10.5 wt % |
| (x) | C$_8$H$_{17}$O—⟨⟩—⟨N=N⟩—O—(CH$_2$)$_7$CHC$_2$H$_5$ (CH$_3$) | A | 8 wt % |
| (xi) | C$_9$H$_{19}$O—⟨⟩—⟨N=N⟩—O—(CH$_2$)$_3$CHC$_2$H$_5$ (CH$_3$) | A | 18 wt % |
| (iii) | C$_5$H$_{11}$O—⟨⟩—⟨⟩—⟨N=N⟩—C$_8$H$_{17}$ | | 9.7 wt % |
| (iv) | C$_5$H$_{11}$—⟨⟩—⟨⟩—⟨N=N⟩—O—CH$_2$CH(CH$_3$)—O—C(=O)—CH(CH$_3$)—OC$_4$H$_9$ | B | 10 wt % |
| (xii) | C$_6$H$_{13}$—⟨⟩—O—C(=O)—⟨⟩—⟨⟩(F)—O—CHC$_6$H$_{13}$ (CH$_3$) | | 13 wt % |
| (xiii) | C$_8$H$_{17}$—⟨⟩—⟨⟩—O—CH$_2$—⟨⟩—C(=O)—O—CHC$_6$H$_{13}$ (CH$_3$) | | 7 wt % |

The transition temperature of the thus obtained ferroelectric liquid crystal composition was

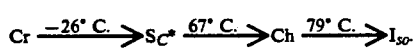

EXAMPLE 2

In accordance with the present invention, a ferroelectric liquid crystal composition having the following composition was prepared:

| | | |
|---|---|---|
| (i) 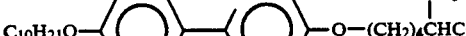 | A | 9.8 wt % |
| (ii) 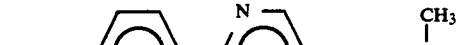 | A | 14 wt % |
| (ix) 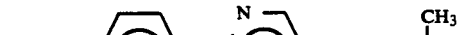 | A | 10.5 wt % |
| (x) 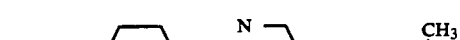 | A | 8 wt % |
| (xi)  | A | 18 wt % |
| (iii)  | | 9.7 wt % |
| (iv) 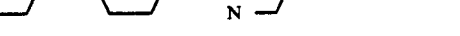 | B | 9.5 wt % |
| (xii)  | | 13 wt % |
| (xiii) 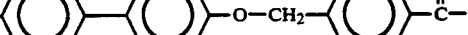 | | 7.5 wt % |

The transition temperature of the thus obtained ferroelectric liquid crystal composition was

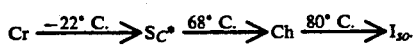

AT 25° C., Ps was 60 nCcm$^{-2}$, the tilt angle was 42°, and the response time was 310 μsec. Furthermore, a helical pitch in the Ch phase in the vicinity of an S$_C$*-Ch transition temperature was 50 μm or more, and the helical pitch in the S$_C$* phase was so long as not to form a helical structure in a 10-μm cell, which meant that alignment was good.

As is apparent from the foregoing, the combination of the components A and B permits obtaining the composition of the present invention which exhibits the S$_C$* phase in a wide temperature range inclusive of room temperature and which has the quick response properties, the large tilt angle and the long pitches in the Ch and S$_C$* phases.

EXAMPLE 3

To the ferroelectric liquid crystal composition prepared in Example 2 was added 3% by weight of an anthraquinone dye (trade name D-16; made by BDH Co., Ltd.) represented by the formula

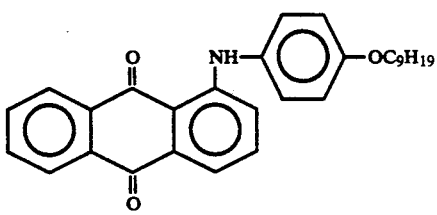

in order to form a guest/host type composition. This composition was then poured into a 10-μm cell, and one polarizer was arranged so that a polarization plane might be in parallel with a molecular axis. Afterward, AC having a low frequency of 0.5 Hz was applied thereto at 50 V, and at this time, a clear switching operation was observed, exhibiting good contrast (1:11.5).

As is apparent from the foregoing, the combination of the components A and B permits obtaining the composition of the present invention which is suitable for the guest/host system having a good contrast.

EXAMPLE 4

In accordance with the present invention, a ferroelectric liquid crystal composition having the following composition was prepared:

AT 25° C., Ps was 71 nCcm$^{-2}$, the tilt angle was 44°, and the response time was 270 μsec.

EXAMPLE 5

In accordance with the present invention, a ferroelectric liquid crystal composition having the following composition was prepared:

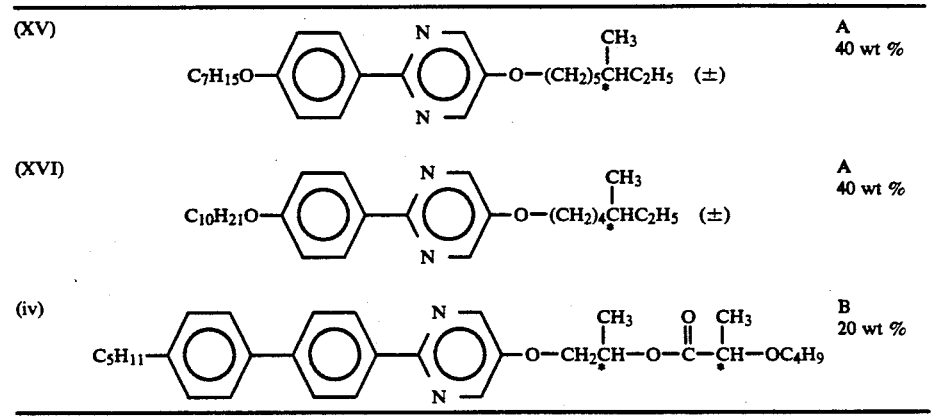

wherein "±" denotes a racemic modification.

The transition temperature of the thus obtained ferroelectric liquid crystal composition was

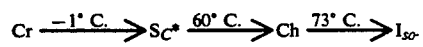

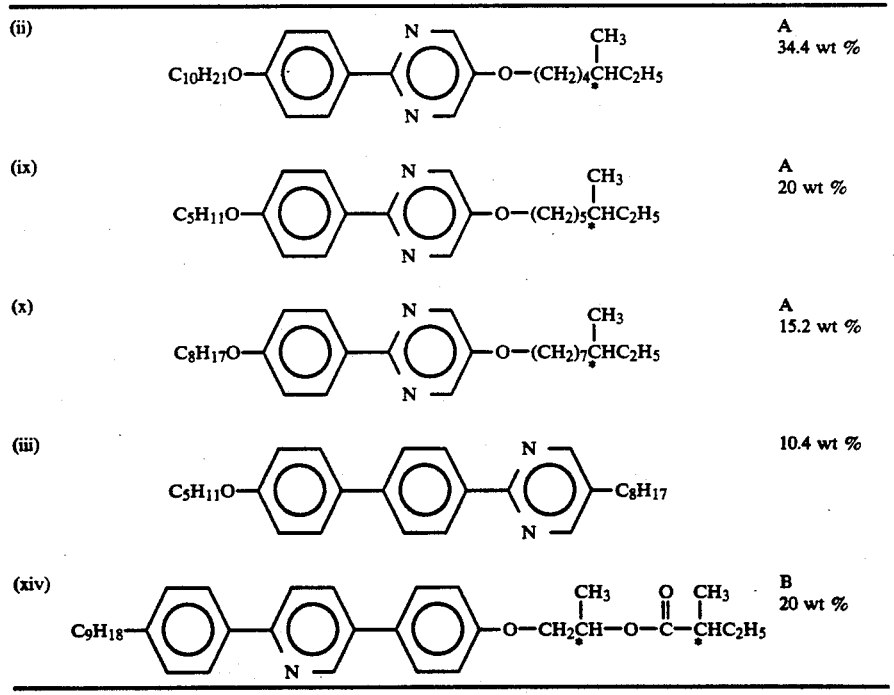

The transition temperature of the thus obtained ferroelectric liquid crystal composition was

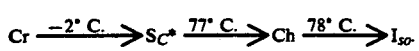

At 25° C., Ps was 94 nCcm$^{-2}$, the tilt angle was 46°, and the response time was 260 μsec.

EXAMPLE 6

In accordance with the present invention, a ferroelectric liquid crystal composition having the following composition was prepared:

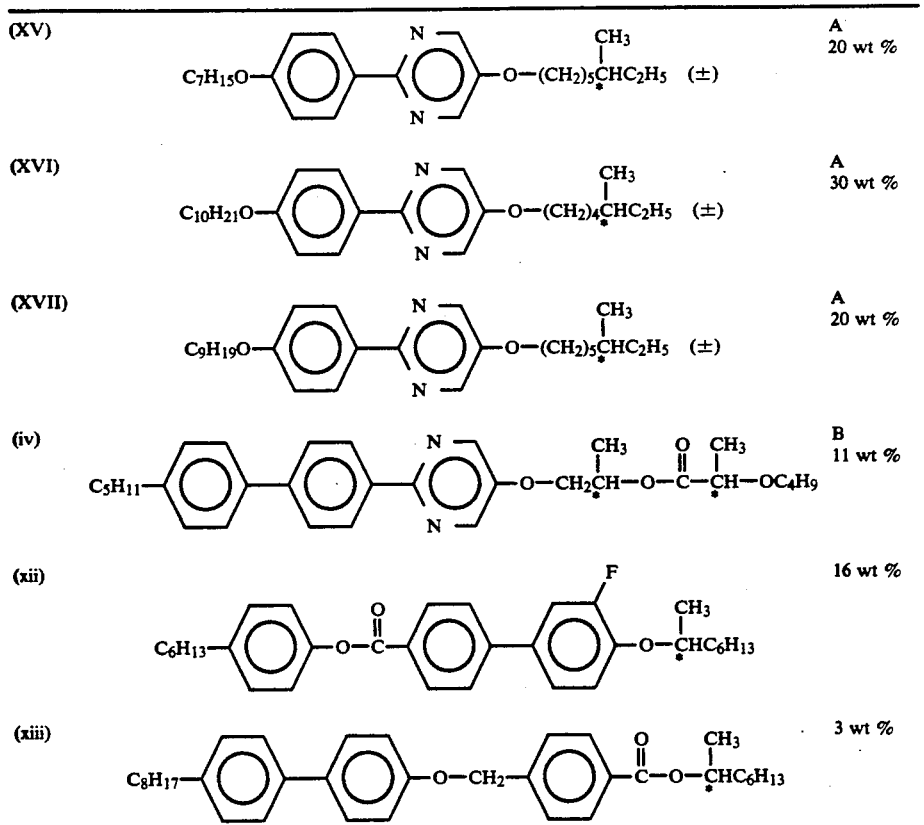

The transition temperature of the thus obtained ferroelectric liquid crystal composition was

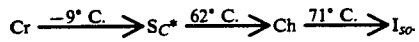

At 25° C., Ps was 69 nCcm$^{-2}$, a tilt angle was 44°, and a response time was 270 μsec. Furthermore, a helical pitch in the Ch phase in the vicinity of an Sc*-Ch transition temperature was 50 μm or more, and the helical pitch in the Sc* phase was as long as 15 μm at 25° C. Any helical structure was not formed in a 10-μm cell, which meant that alignment was also good.

What is claimed is:

1. A ferroelectric liquid crystal composition comprising at least one component A and at least one component B described hereinafter, the content of said component A being from 30 to 95% by weight and the content of said component B being from 5 to 50% by weight, said component A being a compound represented by the formula (I)

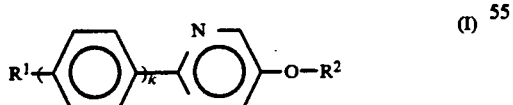

wherein R$^1$ is an alkoxy group having 3 to 14 carbon atoms, k is an integer of 1, and R$^2$ is an optically active group represented by the formula (II)

wherein l is an integer of 2 to 7, R$^3$ is an alkyl group having 2 to 4 carbon atoms, and * denotes an asymmetric carbon atom, said component B being a ferroelectric liquid crystal compound having a spontaneous polarization of 10 nCcm$^{-2}$ or more, and represented by the formula (III)

wherein R$^4$ is an alkyl group or alkoxy group having 2 to 14 carbon atoms, m is an integer of 1 or 2, n is an integer of 0 or

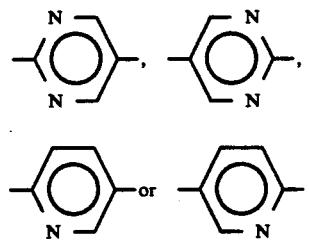

and R$^5$ is an optically active group represented by the formula (IV), (V) or (VI)

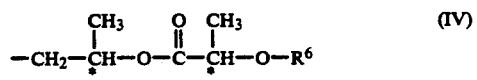

-continued

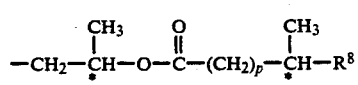 (V)

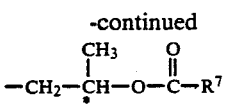 (VI)

wherein each of $R^6$, $R^7$ and $R^8$ is an alkyl group having 2 to 10 carbon atoms, p is an integer of 0 or 1, and * denotes an asymmetric carbon atom.

2. A ferroelectric liquid crystal composition according to claim 1, wherein $R^1$ of said formula (I) is an alkoxy group having 3 to 12 carbon atoms.

3. A ferroelectric liquid crystal composition according to claim 1 wherein a compound containing said group of formula (II) is a racemic modification.

4. A ferroelectric liquid crystal composition according to claim 1 wherein the phase transition series of said ferroelectric liquid crystal composition is an isotropic liquid → a cholesteric phase * a chiral smectic C phase proceeding in the order of from a high-temperature side to a low-temperature side.

5. A switching element containing said ferroelectric liquid crystal composition according to claim 1.

6. A ferroelectric liquid crystal composition according to claim 1 wherein X of the formula (III) is

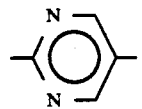

when m=2, n=0 or when m=1, n=0, and is

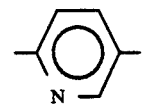

when m=1, n=1.

7. A ferroelectric liquid crystal composition according to claim 6 wherein the phase transition series of said ferroelectric liquid crystal composition is an isotropic liquid → a cholesteric phase → a chiral smectic C phase proceeding in the order of from a high-temperature side to a low-temperature side.

8. A ferroelectric liquid crystal composition according to claim 7 wherein $R^1$ of said formula (I) is 3 to 12 carbon atoms, l is an integer of 3 to 7, and $R^3$ is an ethyl group.

9. A ferroelectric liquid crystal composition according to claim 4 wherein a compound containing said group of formula (II) is a racemic modification.

10. A ferroelectric liquid crystal composition according to claim 6 wherein a compound containing said group of formula (II) is a racemic modification.

11. A ferroelectric liquid crystal composition according to claim 7 wherein a compound containing said group of formula (II) is a racemic modification.

12. A switching element containing said ferroelectric liquid crystal composition according to claim 4.

13. A switching element containing said ferroelectric liquid crystal composition according to claim 6.

14. A switching element containing said ferroelectric liquid crystal composition according to claim 7.

15. A ferroelectric liquid crystal composition according to claim 1 wherein said composition has a tilt angle of at least 42°.

16. A ferroelectric liquid crystal composition according to claim 1 wherein said composition has a response time of at most 250 μsec.

* * * * *

UNITED STATES PATENT AND TRADEMARK OFFICE
CERTIFICATE OF CORRECTION

PATENT NO. : 5,106,531
DATED : April 21, 1992
INVENTOR(S) : Murashiro et al.

It is certified that error appears in the above-identified patent and that said Letters Patent is hereby corrected as shown below:

Claim 1, column 27, line 65, change "$-(CH_2)_l$" to ---$(CH_2)_l$--;

column 28, line 34, change "$l$ " to --$l$--;

line 49, after "or" insert -- 1,X is --.

Claim 4, column 29, line 24, change "$\chi$" to --$\ell$--.

Claim 8, column 30, line 17, change "$l$" to --$l$--.

Signed and Sealed this

Twenty-fourth Day of August, 1993

Attest:

BRUCE LEHMAN

*Attesting Officer*     *Commissioner of Patents and Trademarks*